United States Patent
Bhagavath et al.

(10) Patent No.: US 6,647,001 B1
(45) Date of Patent: Nov. 11, 2003

(54) PERSISTENT COMMUNICATION WITH CHANGING ENVIRONMENT

(75) Inventors: Vijay K. Bhagavath, Lincroft, NJ (US); Joseph Thomas O'Neil, Staten Island, NY (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/455,119

(22) Filed: Dec. 6, 1999

(51) Int. Cl.[7] .................................................. H04Q 7/24
(52) U.S. Cl. ....................... 370/331; 370/338; 370/401; 370/352; 370/475; 455/436
(58) Field of Search ................................ 370/351, 389, 370/392, 394, 400, 401, 331, 338, 475; 455/436, 438, 439

(56) References Cited

U.S. PATENT DOCUMENTS

| | | | |
|---|---|---|---|
| 5,440,547 A | * 8/1995 | Easki et al. | 370/395.3 |
| 6,038,233 A | * 3/2000 | Hamamoto et al. | 370/401 |
| 6,172,986 B1 | * 1/2001 | Watanuki et al. | 370/466 |
| 6,393,014 B1 | * 5/2002 | Daly et al. | 370/352 |
| 6,400,722 B1 | * 6/2002 | Chuah et al. | 370/401 |
| 6,473,406 B1 | * 10/2002 | Coile et al. | 370/248 |
| 6,473,413 B1 | * 10/2002 | Chiou et al. | 370/331 |

* cited by examiner

*Primary Examiner*—Ricky Ngo
*Assistant Examiner*—Yvonne Q. Ha

(57) ABSTRACT

The invention provides persistent communication for address routed communication in an environment where the communication session address changes. The invention is appropriate for any address routed communication, and in particular to packet based (e.g., UDP/IP and TCP/IP) communications to mobile cellular units as the units transition or move between supporting cells. The invention provides a technique to store address information and transitory information related to the session to allow continuation of the session at the new address, thereby reducing or eliminating the need to set up the session at the new address. One application is for streaming multi-media sessions. Another application is for internet protocol (IP) telephony. The invention provides embodiments where the techniques are performed within the mobile unit, or performed in combination with a proxy server that is part of the supporting cellular system.

45 Claims, 5 Drawing Sheets

PERSISTENT COMMUNICATION WITH CHANGING ENVIRONMENT

BACKGROUND OF THE INVENTION

1. Field of the Invention

The invention relates to address routed communication, such as packet switched sessions, carrying continuous types of media and more particularly to continuing or maintaining the communication through address changes.

2. Background Information

In communication systems, there are two general types of communication routing. One type uses what is generally referred to as a circuit switched routing system. The other type uses what is generally referred to a packet switched, or address routed system.

In a circuit switched system, a communication session is established between two or more terminals and the required communication resources (bandwidth, channels, etc.) are assigned to the session until the session ends, or otherwise changes. The public switched telephone network (PSTN) is generally considered a circuit switched system. A call is assigned communication resources when the caller places the call and those resources are indefinitely assigned to that call. In a circuit switched system carrying voice communications, signal latency is typically a primary design consideration, while signal loss or distortion is a secondary design consideration. In simple terms, fast is better than perfect. This is appropriate for voice communication, where a person adjusts to distortion or loss in quality much easier than they adjust to delay.

With the advent of data networks and the need to transport data between and across those networks, a different type of communication system has evolved. These data networks typically establish a communication session using a communication stream that is divided into individually addressed data bursts or packets. These information packets have address information appended to the data and are routed across the communication medium using that address information. However, in contrast to a circuit switched network, the connections for this type of communication are established by a switching matrix that routes the data packets based on the appended address information. As the switching matrix and loading changes dynamically, individual data packets are frequently routed through different paths from the source to the destination, arriving out of order. To compensate for the change in order, some form of data buffering is required at the receiver, which can introduce delay. In addition, error correction may require that data packets be re-transmitted if the receiving terminal detects an error. Buffering and error correction both introduce delay. In a packet switched communication system, a primary consideration is maintaining data integrity and eliminating errors, while a secondary consideration is data latency. In simple terms, information integrity and fidelity is better than speed of delivery for most data. This is of course appropriate for data, where the data may have no value if it includes a single error.

There are a number of known data networking protocols, which include: TCP/IP; UDP/IP; NetBEUI; & IPX/SPX. Most of these data networking protocols are appropriate for packet switched or address routed communication, though they may have been developed for specialized applications or equipment.

Different transport media are integrated and part of the circuit switched and packet switched communication transmission systems. Some transmission systems use wired transport media and others use wireless. Wired or terrestrial transmission systems include twisted pair, coaxial, and fiber optic. Other assorted transmission systems, which are used in conjunction with wireless systems include light frequency, and radio frequency systems. Some of these transport media are more commonly associated with circuit switched systems and other transport media are more commonly associated with packet switched systems. However, the inter-connection and cross-over of the different types of systems is on-going.

In addition, there are hybrid protocols and services, such as Asynchronous Transfer Mode (ATM). From the user perspective, ATM service can provide what appears to be a virtual circuit switched session using packet switched protocols. This is because the user can request and get a quality of service guarantee (the users request or reserve a specified signal latency, with specified error tolerance).

Many of these different protocols and media have been adapted to handle large bandwidth real-time applications from fixed point to fixed point. As a result, a user at a desktop computer can connect using a wired or wireless connection to a streaming multi-media server over the Internet using packet switching techniques and protocols and participate in a streaming multi-media session that displays characteristics of a circuit switched network.

With the appropriate conditions, the user is able to establish a streaming multi-media session with a low signal latency to provide good real-time interaction, and a low data error rate to provide good fault tolerance and error recovery. The user establishes the desired service during setup of the streaming multi-media session. The system then provides the requested service until the user terminates the session, or the user requests a change. However, if the streaming multi-media session is improperly terminated for any number of reasons, the user is unable to resume the streaming multi-media session at the exact point where they left off. As typically occurs in a streaming content session, the user must re-establish the session with the associated set-up and then replay the session up to the point of the termination or attempt to fast-forward to the point where the session was dropped or lost. If the streaming multi-media session is a live session, this may be impossible.

There are many reasons for the session to be improperly lost, dropped or terminated. One common reason for improper termination is movement of a mobile user from one cell to another cell in a cellular system. This is because cellular protocols do not adequately support streaming multi-media sessions that use address routed communications. Part of the problem is that there is little communication between the different communication layers. Changes in the transport or other lower layers can affect higher protocol or data layers. However, the techniques to exchange information between the layers are poor or non-existent.

In a streaming multi-media session, the data packets are most commonly transmitted over a packet switched network. This means that the packets and transmission system consistently rely on the source and destination addresses to properly route or switch the packets from the source to the destination. When a streaming multi-media session is established, the streaming server and the receiving or destination client exchange address information. This address information is then used during the streaming multi-media session as part of the address routing to send information packets between the server and the client. In a simplification, data packets from the server (the streaming source) include the client (destination) address in the data packet header. Data packets from the client (the stream receiver) include the server (streaming source) address in the data packet header. In this manner, the client and server are able to communicate with each other and maintain a duplex communication circuit. However, once the streaming multi-media session is established, the client and server do not expect the address information to change. Because the server does not expect the client address to change, when the address information does change in mid-session, the streaming multimedia session improperly terminates.

In a cellular system, as a mobile unit moves between cells, the supporting wireless communication circuits constantly set up and tear down the circuits between the base stations and the mobile unit. This occurs through a combination of information exchange between the mobile unit and the base stations over control channels, with set up and tear down of the communication channels for each cell. To the mobile voice communication user, the set up and tear down at the cell boundaries is usually transparent, or only a slight and momentary loss in signal quality. To the mobile data communication user, the set up and tear down may be noticed if the change occurs while a data packet is being transmitted. If the data packet is corrupted, the mobile unit will automatically request retransmission of the corrupted data packet. However, each such request also includes the mobile unit's current address, so when the retransmission is requested after the mobile unit has completed the transfer to the new cell, the new mobile address will be included in the request and other than a short delay, the movement to a new cell will be transparent to the user.

However, in a UDP/IP streaming multi-media session to a mobile unit, with a TCP/IP control session, the packet address of the mobile unit, which is used for transmission of the multi-media data packets, is based on the IP address of the cell currently supporting the mobile unit. Accordingly, as the mobile unit moves from cell to cell, the data packet address of the mobile unit must also change. This means that as a mobile unit leaves one cell and enters another cell, any streaming multi-media session addressed to the mobile unit will improperly terminate because the IP address of the mobile unit changes. As described above, for non-continuous address routed data communication, such as web browsing, the mobile unit will have to reload the desired page if they are loading a page at the same time that they move from one cell to another cell. For a streaming multi-media session, the result of an IP address change is improper termination of the session and the need to set up the session all over again.

Systems and methods are needed to provide persistent communications in address routed communication systems, particularly streaming types of multi-media, in support of users with changing addresses.

SUMMARY OF THE INVENTION

In one aspect, the invention provides a method and apparatus for conducting an address routed communication session at a communication terminal. The terminal has a first address that is used to route session information from a session source to the terminal. The invention determines that the terminal requires a change of the first address to a second address during the communication session. The invention changes the terminal address from the first address to the second address without terminating the session, and continues the communication session using the second address to route session information from the session source to the terminal. The invention further captures transitory state information (such as frame number, sequence number and packet number) when the communication session is using the first address. The transitory state information is used to continue the communication session using the second address. The communication session may be one or more streaming multi-media sessions using internet protocol as the address routing scheme. The communication session may also be an internet telephony session. In one embodiment, the terminal is a cellular communication device using packet based addressing and the address change corresponds to a movement of the terminal from one cell to another cell. In this manner, a terminal is able to change address of a communication session without terminating the session.

In one aspect, the invention provides a method and apparatus for accomplishing the method with software or hardware contained within the mobile unit or terminal. In this manner, minimal changes are required to the underlying cellular and server architecture.

In one aspect, the invention provides a method and apparatus for accomplishing the method with a proxy server and software or hardware contained within the proxy server. In this manner, minimal changes are required in either the mobile unit operation and software, or the session server architecture.

The foregoing specific aspects and advantages of the invention are illustrative of those which can be achieved by the present invention and are not intended to be exhaustive or limiting of the possible advantages that can be realized. Thus, the objects and advantages of this invention will be apparent from the description herein or can be learned from practicing the invention, both as embodied herein or as modified in view of any variations which may be apparent to those skilled in the art. Accordingly the present invention resides in the novel parts, constructions, arrangements, combinations and improvements herein shown and described.

BRIEF DESCRIPTION OF THE DRAWING

The foregoing features and other aspects of the invention are explained in the following description taken in conjunction with the accompanying figures wherein.

It is understood that the drawings are for illustration only and are not limiting.

DETAILED DESCRIPTION OF THE INVENTION

The invention is particularly suited to continuous packet based communication sessions (such as UDP/IP streaming multi-media using a TCP/IP control session) to a mobile unit, where the mobile unit transits between cells. The mobile unit has an assigned IP address that is used to route the packets, and when the mobile unit moves to a new cell, the IP address changes. Without the instant invention, the continuous packet based communication session is dropped because the source no longer has the correct IP address of the mobile unit.

Examples of the continuous packet based communication sessions that are particularly assisted by the instant invention include streaming multi-media and Internet Protocol (IP) telephony. For these applications, the data stream and information content have reduced value if there is significant delay. Additionally, for these types of communication session, arbitrary information boundaries in the data stream to allow recovery after an unexpected termination are not well defined. This can be contrasted to traditional Web browsing, where failure during loading of a particular page is remedied by reloading the page. In the streaming or continuous data session, there is no convenient "reload" or "refresh".

Figure 1:
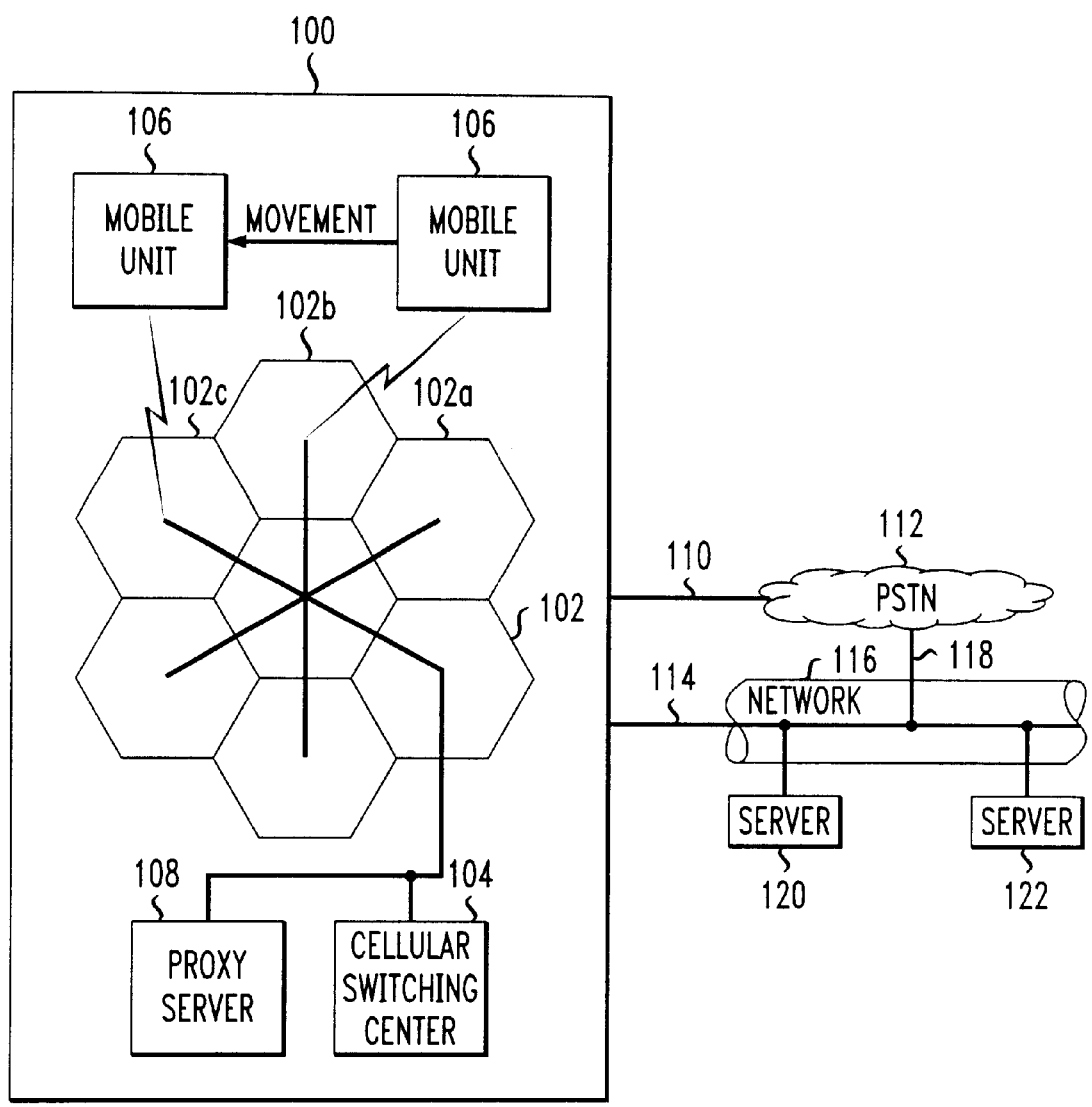
FIG. 1 illustrates an embodiment of the system according to the instant invention.

FIG. 1 illustrates an embodiment of a system according to the invention. The invention includes system 100, which further includes a plurality of cellular base stations 102, each in a cellular zone, the base stations connected to a cellular switching center 104. Each base station 102 is operable with a plurality of mobile units 106 over radio frequency links between the base station and the mobile units. Though not illustrated, system 100 also includes other elements of a wireless or cellular network, including location registers, control circuitry, switching circuitry, etc. Accordingly, certain aspects of the architecture of the cellular system, including known functions and operation of base stations 102, mobile stations 106 and cellular switching center 104 conform to analog and digital cellular architectures that are deployed in the United States and foreign countries. As these standards and architectures are constantly evolving, they are not here specifically described.

Also part of system 100 is proxy server 108, which is connected to the base stations 102 and cellular switching center 104. Proxy server 108 provides proxy services for mobile units 106 in some embodiments of the invention.

Also not illustrated, but understood to be parts of system 100 (mobile units 106, base stations 102, proxy server 108 and cellular switching center 104) are assorted computers with processors, memory and storage capability, both volatile and non-volatile. These computers function using computer code that is loaded from the storage into a memory and thereby serve as instructions for the processor.

System 100 is connected to and therefore part of a wide area network. System 100 is also connected to and therefore part of the conventional telecommunications network. Connection 110 provides a connection to the public switched telephone network (PSTN) 112 to link wireless communications between mobile units and other users connected to the PSTN. In one embodiment, connection 114 provides a connection between system 100 and network 116. In another embodiment, system 100 is connected to network 116 by connections 110, 118 and PSTN 112.

Using one of the disclosed connections between system 100 and network 1 16, mobile unit 106 is able to connect to network 116 and thereby access server 120 to establish a session. Server 120 is a streaming multi-media server to provide streaming multi-media content to users. As part of the session set-up, mobile unit 106 and server 120 exchange data addresses. When mobile unit 106 is connected to base station 102b, the data address of the mobile unit is a subset of the addresses assigned to base station 102b. For example, the IP address for base station 102b is 205.204.203.XXX. This allows up to 254 mobile units to register and operate within the cell of base station 102b, each with distinct IP addresses (e.g., 205.204.203.001, 205.204. 203.002 205.204.203.254) (It should be noted that host addresses 000 and 255 have unique characteristics in the IP address protocol, so are not available for a particular mobile unit) Accordingly, mobile 106 can be assigned any one of these 254 IP address (e.g., 205.204.203.100) when operating within the cell covered by base station 102b.

When mobile unit 106 moves from the cell covered by base station 102b to the cell covered by base station 102c, the IP address for the mobile unit will change from the address associated with base station 102b to an address associated with base station 102c. If base station 102c has IP address 205.204.202.XXX, then the IP address for mobile unit 106 might change from 205.204.203.100 to 205.204.202.200 when moving from coverage by base station 102b to 102c.

However, as indicated above, certain types of session connections rely on a constant address router, and have poor or no recovery when the address changes. As a result, when the address of mobile unit 106 changes, in correspondence to the change in base station, the session address changes, and the session terminates improperly.

To accommodate this change in address, mobile unit 106 of the instant invention constantly monitors and temporarily stores the transitory state information of the session, as well as the address information. When the mobile unit determines that a change in their address is likely or directed, the stored state information and address information allows the mobile unit to gracefully change address, without improper termination of the session.

Knowledge that the mobile unit is likely to change address or that a change is directed is available through a number of different techniques. In one technique, the multimedia session software in the mobile unit monitors the received cellular signal strength from the various base stations in the vicinity and determines if the signal strength of the currently supporting base station has declined below that of other base stations. When this occurs, the session management software in the mobile unit has an indication that the address of the mobile unit will shortly change from the current base station to one of the stronger base stations. However, it may not be clear which of the other base stations will be the new supporting base station.

In another technique, the multimedia session software in the mobile unit also monitors the command channel and determines the base station change in exactly the same manner as the mobile station determines that a normal change in base station support due to mobile unit movement is required. This has an advantage of minimizing or eliminating false address changes, but minimizes the time available for a transition of the session from one address to another address.

The examples provided above have an advantage of minimizing the need for significant modifications to the cellular network software and architecture. Most, if not all of the required modifications can be implemented in the mobile units. The session software maintains knowledge of the current address, and transitory information of the session. The address and transitory information include things like IP address and port number of each media server from which the mobile unit is receiving streaming multi-media content; and the current frame number or timestamp of the session. The current address and transitory information is stored in a temporary buffer, and is overwritten as it changes. The session software also monitors the command channel to determine upcoming address changes. Using this information, the mobile unit is able to save transitory session information, as well as the old and new address information. Using this information, the mobile unit is able to either preemptively transfer the session to the new address, or shift the session address at the same time as the address changes without disconnecting or terminating the session.

Figure 2:
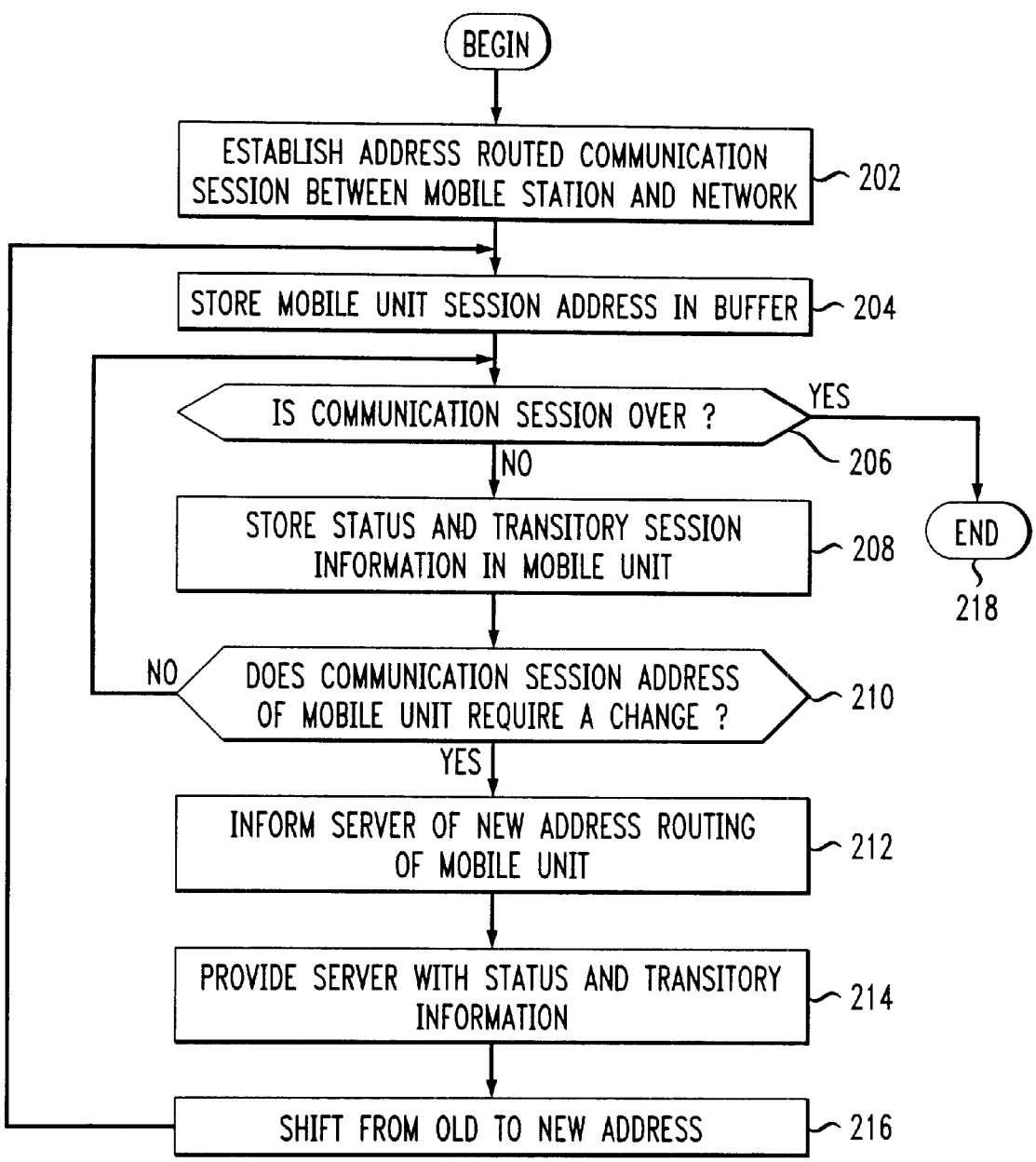
FIG. 2 illustrates an embodiment of a method according to the instant invention.

The steps in FIG. 2 illustrate one embodiment of the instant invention. At step 202, mobile unit 106 establishes a streaming multi-media session with server 120.

At step 204, mobile unit 106 stores the address information in a temporary buffer. In this example, the TCP/IP address information of the mobile unit is the IP address that is assigned to the mobile unit by the supporting cellular base station.

At step 206, mobile unit 106 determines whether the multi-media session is over. If the session is over, the mobile unit terminates the session at step 218.

If the session is not over, then at step 208, mobile unit 106 stores status information related to the session and transitory information related to the session and mobile unit in a buffer. The loop between steps 210 and 206 ensures that this stored information is constantly updated as the session progresses.

At step 210, mobile unit 106 determines whether the communication address of the mobile unit will require a change. As discussed above, this may be an advance indication of the need for a change, such as declining signal strength from the current base station, or it may be an indication on the command channel that the mobile unit is being directed to change from the current base station to another base station. If the communication address is not changing, mobile unit loops to step 206 and again determines whether the session is over.

If the communication address is changing, then at step 212, mobile unit 106 informs server 120 of the new address and at step 214 also informs server 120 of the transitory information regarding the session. Server 120 uses the new address information as the new address for session data, and uses the transitory state information of the session to determine where in the session to begin sending data to the new address. For example, if mobile unit 106 has received packets through 65423 at the old address, then the new address is provided to server 120 with an indication that the session is to continue on the new address beginning with packet 65424. With recorded or stored session material, server 120 is able to seamlessly shift the session from the old address to the new address without disconnecting or the need to re-establish the session from a starting point. With real-time streaming content and a short term buffer in the server, it may even be able to continue the session by transmitting buffered session information without any information or time gap. Of course, if the session is truly live, without any recording or buffer by server 120, there may be slight gap in session material if the mobile unit is not able to provide sufficient advance information to server 120.

After providing the new address at step 212 and transitory information at step 214, mobile unit 106 shifts from the old session address to the new session address at step 216.

After shifting address, mobile unit 106 loops to step 204 and overwrites the buffer holding the session address with the new session address. The new session address is determined from the address of the new base station that is now supporting the mobile unit. This continues until the mobile unit determines that the session is over at step 206 and ends at step 218.

Figure 3:
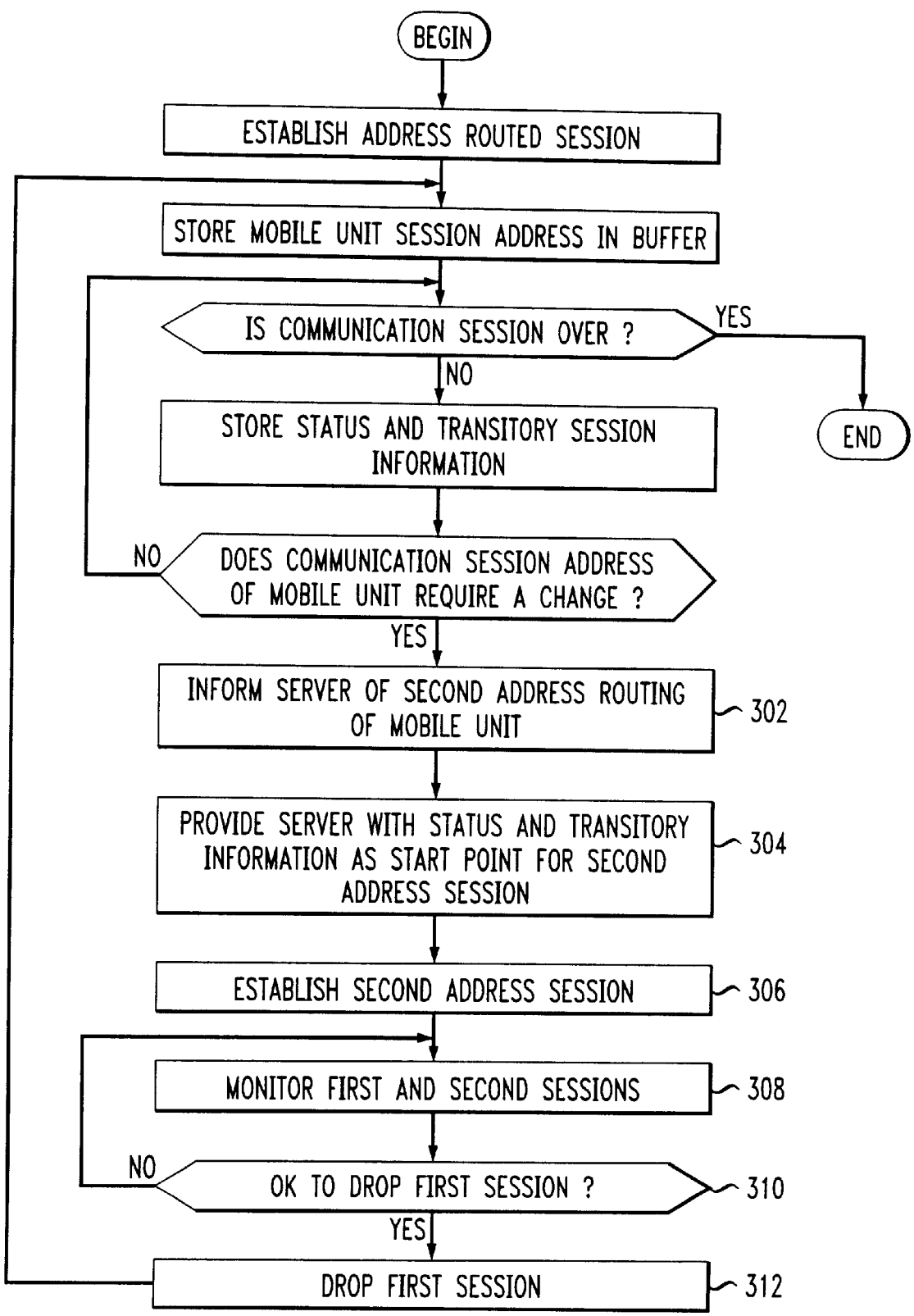
FIG. 3 illustrates an embodiment of a method according to the instant invention.

FIG. 3 illustrates an embodiment that is particularly useful when there is a desire to minimize the possibility of lost session information. In this embodiment, mobile unit 106 sets up overlapping sessions using the old and new addresses. This requires that the mobile unit have the ability to maintain simultaneous communication with two base stations. In this manner, it is relatively straightforward to setup the new session on the new address at steps 302, 304 & 306, monitor both sessions until the new session is properly received at steps 308 & 310 and then drop the old address and base station at step 312. For mobile units that are able to accomplish simultaneous communication with the old and new base stations, the embodiment of FIG. 3 provides a technique to ensure that no session information is lost.

Proxy Server Embodiments

Figure 4:
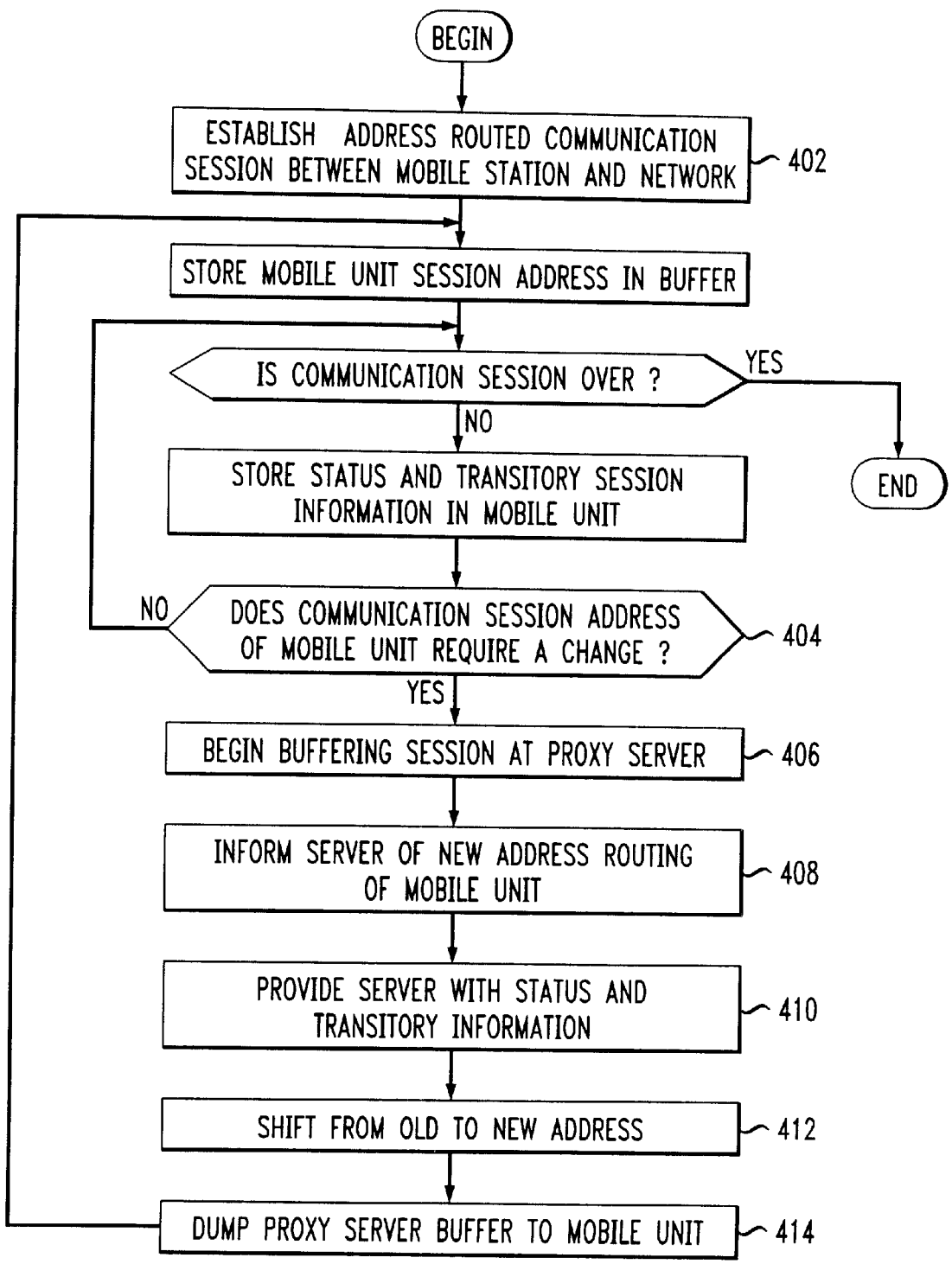
FIG. 4 illustrates an embodiment of a method according to the instant invention.

FIG. 4 illustrates an embodiment that provides session information persistence to minimize even momentary loss of session information when server 120 does not provide session buffering and the mobile unit can only communicate with a single base station at one time. In this embodiment, proxy server 108 provides the required buffer.

The steps for this embodiment are similar to the steps illustrated in FIG. 2 with certain changes. At step 402, when mobile unit 106 establishes a streaming multi-media session, it also informs proxy server 108 that it requires uninterrupted session information.

At step 404, it is determined that the communication session of the mobile unit will change. Then, at step 406, proxy server 108 begins to buffer the session information. Because proxy server 108 does not have any disruption in connection to server 120, any session information that might be lost while mobile unit 106 changes from base station 102b to 102c is buffered by proxy server 108. The determination at step 404 can be performed by mobile unit 106 as described above, or by proxy server 108. Proxy server 108 is able to determine, through the command channel information, when mobile unit 106 will move from the coverage of base station 102b to the coverage of base station 102c.

At step 408, the mobile unit provides the session address change to server 120, along with session status and transitory information at step 410. Then, at step 412, mobile unit 106 shifts from the old to new address. Proxy server 108 buffers information from the old address during the address change.

Once the new address session is established, then at step 414, proxy server 108 dumps the buffered session information to mobile unit 106. Because almost all sessions have some buffering by mobile unit 106, any slight irregularity in the session due to the buffer and forward by proxy server 108, is easily accommodated and unnoticeable to the user.

Figure 5:
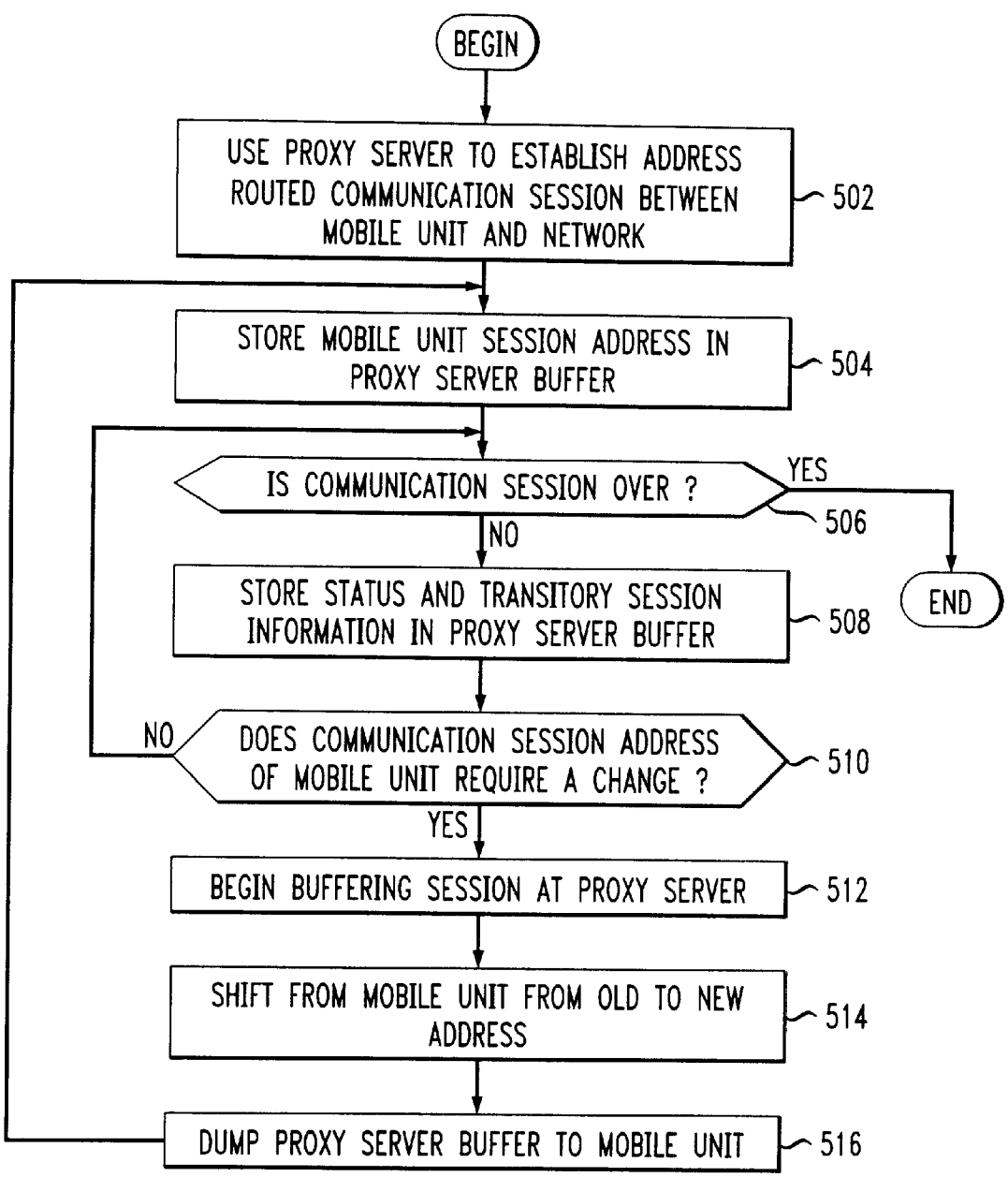
FIG. 5 illustrates an embodiment of a method according to the instant invention.

FIG. 5 illustrates an embodiment where a proxy server provides an interface between the mobile unit and the server to buffer session information and coordinate address changes.

At step 502, mobile unit 106 establishes an address routed communication session with server 120 using proxy server 108.

At step 504, the mobile unit address is stored in a buffer in proxy server 108.

At step 506, the mobile unit or proxy server determine whether the session is over, ending at step 518 if the session is over.

At step 508, the status and transitory session information is stored in a buffer in proxy server 108. This information is continuously updated by the loop between steps 510 and 506.

At step 510, the mobile unit or proxy server determine whether the session address requires a change. If not, the method loops to step 506.

At step 512, if the session address requires a change, proxy server 108 begins to buffer the session information, while continuing to forward the session information to the mobile unit.

At step 514, while continuing to buffer the session information, the proxy server shifts the mobile unit address from the old to new address. However, the address routed session address that is used by server 120 remains the original address that was established in step 502.

At step 516, after the mobile unit is receiving information on the new address, proxy server 108 dumps the session buffer information to the mobile unit. The method then loops to step 504, where the new mobile unit address is written to the proxy server buffer. Proxy server 108 uses this new address to forward the address routed session communication to the mobile unit. This eliminates the need to have server 120 change the session address. It also allows mobile unit 106 to freely move anywhere within coverage of system 100 and support by proxy server 108 without unintended session termination.

Although illustrative embodiments have been described herein in detail, it should be noted and will be appreciated by those skilled in the art that numerous variations may be made within the scope of this invention without departing from the principle of this invention and without sacrificing its chief advantages.

One such variation includes internet protocol (IP) telephony to the mobile unit. In this type of telephony, the telephone call is an address routed data stream that is overlaid on the cellular transmission. As the mobile unit moves from cell to cell, the mobile unit must arrange to continue the IP telephony session across cell boundaries. This is different from existing cellular communications. In existing cellular systems, there is an address (the telephone number) of the source and destination. However, that address (telephone number) does not change as the mobile unit moves from cell to cell. In the cellular system there is also a changeable address (cell routing address that is used by the cellular system to route the cellular connection to the mobile unit). However, the changeable address is not used end-to-end by the source and destination. The address used end-to-end is the telephone number. Because the end-to-end address (telephone number) does not change in traditional cellular systems, the source does not need to know when the mobile unit moves from cell to cell. The cellular system provides that support. A source in a voice mobile cellular system may use the destination telephone number to set-up a communication connection. However, the source does not use the telephone number to route information after the set-up, and there is no provision to change the destination telephone number after the set-up. For this reason, traditional cellular routing using the telephone number as the address is not an address-routed communication session.

However, when an address routed communication session, such as streaming multi-media, or IP telephony, is overlaid on the cellular system, the end-to-end address will change as a mobile unit moves from cell to cell. For this reason, the instant invention is applicable to streaming multi-media, IP telephony, and other address routed communication systems.

The examples have described streaming multi-media sessions originating at a single source. Referring to FIG. 1, it is also possible for mobile unit 106 to establish an address routed communication session with both servers 120 and 122. These sessions use the described address routing to send the data packets to the IP address of the mobile unit and the mobile unit is able to receive both sets of information as part of the session. For example, one server may provide video imagery of a presentation, while the other server provides a whiteboard display, or duplicates the overhead charts of the presentation. The mobile unit may selectively determine that they want both streams to fully participate in the session. Accordingly, when the mobile unit moves from the supporting cellular base station cell to another cellular base station, the IP address information of mobile unit is incorrect at both server 120 and server 122. The instant invention captures the transitory state information and address information for both sessions and provides a smooth transition to the new address, thereby preventing an improper session termination.

The examples have described a streaming multi-media session that originates from a source server and is directed to a mobile unit. There are other types of multimedia session, such as multi-casting, where the source server does not maintain or know the addresses of the individual recipients. In this type of multi-media, the recipient informs the system and network of their desire to receive the multicast data stream. That information (including aspects of the recipient IP address) is provided to the network so that the recipient can receive the multicast. The mobile unit (the terminal in this example), is a recipient of an address routed communication session. The terminal address is used to route session information from the session source to the terminal. When the terminal address changes, the communication session can continue using the new address to route the session information to the terminal. As seen in this example, it is not a requirement that the session source server know the mobile unit address, merely that the information is routed according to the mobile unit address.

The examples have described the invention using TCP/IP, UDP/IP and other data networking protocols. There are other protocols, such as real time protocols (RTP) and real time streaming protocols (RTSP) that are appropriate for the instant invention. In the protocols envisioned for the invention, the transitory state information includes frame numbers, time stamps, sequence numbers and other position or status indicators for the session.

In the above-described examples, existing cellular concepts have been used to illustrate the invention. However, as understood by those of ordinary skill, most current cellular systems provide Kilobit range connections and are not able to provide broadband data connections (Megabit range) to mobile units. However, techniques to provide higher bandwidth connections to mobile units are in development. Accordingly, it is expressly anticipated that the instant invention has significant applicability to newer technologies supporting mobile users.

For in the near future, a mobile user may have a personal digital assistant (PDA) that has wireless broadband streaming multi-media capability. This PDA is initially used to establish the address routed communication session from a docking station at the user's home. The session is started in the morning as part of a larger distributed planning conference that is being coordinated in another time zone. The user's home is part of the wired environment, and therefore has robust communications and is able to easily handle streaming media from server 120 and 122.

When the user determines that they must depart for the train station, and while still participating in the session, they disconnect their PDA from the docking station at their home and walk to the car. The PDA is now operating in the wireless environment. In the car, the user knows that the video aspects of the session will not be particularly helpful and probably distracting, so they instruct server 120 to provide only streaming audio. This also has the advantage of reducing the transmission bandwidth requirements, which can be particularly stressing in the wireless environment. As the user drives to the train station, they travel through a number of cells and the session is handed off from cell to cell along the way.

When the user boards the train, they are again able to dock the PDA with a docking port provided on the train. This docking port provides higher bandwidth connection for the PDA than the PDA's small antenna can provide, though the connection is still part of the wireless network.

Upon arrival at their office, the user is again able to dock the PDA with a docking station at their desk. This docking port is part of the wired network and therefore is able to provide full bandwidth. Accordingly, the user instructs servers 120 and 122 to resume the full streaming content.

In this example, the PDA started with an IP address that is based on the address of the user's home account. Upon disconnecting from the home docking station, the IP address of the PDA changed to that of the wireless network, and in particular the PDA's IP address is an address that is assigned by the cellular base station. As the user commutes from their home to their office, they pass through many cell boundaries with associated cellular base stations. During that commute, the instant invention ensures that the streaming session continues uninterrupted during those transitions. When the user finally arrives at their office, the PDA is assigned another IP address, the address based on the IP address of the user's office data network.

As the example indicates, the instant invention allows flexible and transparent operation for mobile units using address routed communication in a dynamically changing environment.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

We claim:

1. A method comprising:
   conducting an address routed communication session at a communication terminal, the terminal having a first address that is used to route session information from a session source to the terminal;
   capturing, at the terminal, transitory state information of the communication session when the communication session is using the first address;
   determining that the terminal requires a change of the first address to a second address during the communication session;
   changing the terminal address from the first address to the second address without terminating the communication session;
   continuing the communication session using the second address to route session information from the session source to the terminal; and
   using, at the terminal, the transitory state information of the communication session to continue the communication session using the second address,
   wherein the terminal is a cellular communication device and the first address corresponds to an address assigned for a first cell and the second address corresponds to an address assigned for a second cell.

2. A method according to claim 1, wherein the transitory state information includes information selected from the group consisting of frame number, sequence number, and packet number.

3. A method according to claim 1, wherein the communication session is a streaming multimedia session.

4. A method according to claim 1, wherein the communication session is a UDP/IP session.

5. A method according to claim 1, wherein the first address and second address include an internet protocol address.

6. A method according to claim 1, wherein the communication session includes a plurality of streaming multimedia sessions, the method further comprising capturing transitory state information of the plurality of streaming multimedia sessions.

7. A method according to claim 1, wherein the communication session includes an internet protocol telephony session.

8. A method according to claim 1, wherein the terminal is a cellular communication device and the communication session is a packet based session.

9. A method according to claim 1, wherein the terminal is a mobile terminal and the change of the first address to the second address is a result of movement of the terminal.

10. A method according to claim 1, wherein the communication session continues while changing the terminal address.

11. A method according to claim 1, wherein the communication session is paused but not terminated while changing the terminal address.

12. Computer executable software code stored on a computer readable medium, the code for address routed communication, the code comprising:
    code to conduct an address routed communication session at a communication terminal, the terminal having a first address that is used to route session information from a session source to the terminal;
    code to capture, at the terminal, transitory state information of the communication session when the communication session is using the first address;
    code to determine that the terminal requires a change of the first address to a second address during the communication session;
    code to change the terminal address from the first address to the second address without terminating the communication session;
    code to continue the communication session using the second address to route session information from the session source to the terminal; and
    code to use, at the terminal, the transitory state information of the communication session to continue the communication session using the second address,
    wherein the terminal is a cellular communication device and the first address corresponds to an address assigned for a first cell and the second address corresponds to an address assigned for a second cell.

13. A computer-readable medium having computer executable software code stored thereon, the code for address routed communication, the code comprising:
    code to conduct an address routed communication session at a communication terminal, the terminal having a first address that is used to route session information from a session source to the terminal;
    code to capture, at the terminal, transitory state information of the communication session when the communication session is using the first address;

code to determine that the terminal requires a change of the first address to a second address during the communication session;

code to change the terminal address from the first address to the second address without terminating the communication session;

code to continue the communication session using the second address to route session information from the session source to the terminal; and code to use, at the terminal, the transitory state information of the communication session to continue the communication session using the second address, wherein the terminal is a cellar communication device and the first address corresponds to an address assigned for a first cell and the second address corresponds to an address assigned for a second cell.

14. A programmed computer for address routed communication, comprising:

a memory having at least one region for storing computer executable program code; and a processor for executing the program code stored in the memory; wherein the program code includes:

code to conduct an address routed communication session at a communication terminal, the terminal having a first address that is used to route session information from a session source to the terminal;

code to capture, at the terminal, transitory state information of the communication session when the communication session is using the first address;

code to determine that the terminal requires a change of the first address to a second address during the communication session;

code to change the terminal address from the first address to the second address without terminating the communication session;

code to continue the communication session using the second address to route session information from the session source to the terminal; and code to use, at the terminal, the transitory state information of the communication session to continue the communication session using the second address, wherein the terminal is a cellular communication device and the first address corresponds to an address assigned for a first cell and the second address corresponds to an address assigned for a second cell.

15. A method comprising:

conducting an internet protocol address routed streaming multi-media communication session at a mobile cellular communication terminal, the terminal having a first internet protocol address that is used to route session information from a streaming source to the terminal;

capturing, at the terminal, transitory state information of the communication session when the communication session is using the first address;

determining that the terminal requires a change of the first address to a second internet protocol address during the communication session ms a result of cellular information available to the terminal;

changing the terminal address from the first address to the second address with instructions from the terminal without terminating the communication session;

continuing the communication session using the second address to route session information from the session source to the terminal with instructions from the terminal; and using, at the terminal, the transitory state information of the communication session to continue the communication session using the second address, wherein the first address corresponds to an address assigned for a first cell and the second address corresponds to an address assigned for a second cell.

16. A method comprising:

conducting an address routed communication session with a communication terminal using a first address that is used to route session information from a source to the terminal;

receiving, from the terminal, transitory state information of the communication session captured by the terminal when the communication session is using the first address;

determining that the first address of the terminal will change to a second address during the communication session;

changing the first address to the second address without terminating the communication session;

continuing the communication session using the second address to route the session information from the source to the terminal; and using the transitory state information of the communication session received from the terminal to continue the communication session using the second address, wherein the terminal is a cellular communication device and the first address corresponds to an address assigned for a first cell and the second address corresponds to an address assigned for a second cell.

17. A method according to claim 16, further comprising using a proxy server to conduct the communication session with the terminal.

18. A method according to claim 16, wherein the transitory state information includes information selected from the group consisting of frame number, sequence number, and packet number.

19. A method according to claim 16, wherein the communication session is a streaming multimedia session.

20. A method according to claim 16, wherein the communication session includes a plurality of streaming multimedia sessions, the method further comprising using transitory state information of the plurality of streaming multimedia sessions to continue the sessions.

21. A method according to claim 16, wherein the communication session includes an internet protocol telephony session.

22. A method according to claim 16, wherein the terminal is a cellular communication device and the communication session is a packet based session.

23. A method according to claim 16, wherein the terminal is a mobile terminal and the change of the first address to the second address is a result of movement of the terminal.

24. A method according to claim 16, wherein the communication session continues while changing the first address to the second address.

25. A method according to claim 16, wherein the communication session is paused but not terminated while changing the first address to the second address.

26. Computer executable software code stored on a computer readable medium, the code for address routed communication, the code comprising:

code to conduct an address routed communication session with a communication terminal using a first address that is used to route session information from a source to the terminal;

code to receive, from terminal, transitory state information of the communication session captured by the terminal when the communication session is using the first address;

code to determine that the first address of the terminal will change to a second address during the communication session;

code to change the first address to the second address without terminating the communication session;

code to continue the communication session using the second address to route the session information from the source to the terminal; and code to use the transitory state information of the communication session received from the terminal to continue the communication session using the second address, wherein the terminal is a cellular communication device and the first address corresponds to an address assigned for a first cell and the second address corresponds to an address assigned for a second cell.

27. A computer-readable medium having computer executable software code stored thereon, the code for address routed communication, the code comprising:

code to conduct an address routed communication session with a communication terminal using a first address that is used to route session information from a source to the terminal;

code to receive, from the terminal, transitory state information of the communication session captured by the terminal when the communication session is using the first address;

code to determine that the first address of the terminal will change to a second address during the communication session;

code to change the first address to the second address without testing the communication session;

code to continue the communication session using the second address to route the session information from the source to the terminal; and code to use the transitory state information of the communication session received from the terminal to continue the communication session using the second address, wherein the terminal is a cellular communication device and the first address corresponds to an address assigned for a fist cell and the second address corresponds to an address assigned for a second cell.

28. A programmed computer for address routed communication, comprising:

a memory having at least one region for storing computer executable program code; and a processor for executing the program code stored in the memory; wherein the program code includes:

code to conduct an address routed communication session with a communication terminal using a first address that is used to route session information from a source to the terminal;

code to receive, from the terminal, transitory state information of the communication session captured by the terminal when the communication session is using the first address;

code to determine that the first address of the terminal will change to a second address during the communication session;

code to change the first address to the second address without terminating the communication session;

code to continue the communication session using the second address to route the session information from the source to the terminal; and code to use the transitory state information of the communication session received from the terminal to continue the communication session using the second address, wherein the terminal is a cellular communication device and the first address corresponds to an address assigned for a first cell and the second address corresponds to an address assigned for a second cell.

29. An apparatus comprising:

a communication terminal for conducting an address routed communication session, the terminal further comprising:

a circuit for receiving session information with a first address, the first address used to route the session information from a source to the terminal;

a circuit, at the terminal, for capturing transitory state information of the communication session when the communication session is using the first address;

a circuit for determining that the terminal requires a change of the first address to a second address during the communication session;

a circuit for changing the terminal address from the first address to the second address without terminating the communication session;

a circuit for continuing the communication session with the second address, the second address used to route the session information from the source to the terminal; and a circuit, at the terminal, for using the transitory state information of the communication session received from the terminal to continue the communication session using the second address, wherein the terminal is a cellular communication device and the first address corresponds to an address assigned for a first cell and the second address corresponds to an address assigned for a second cell.

30. An apparatus according to claim 29, wherein the terminal is a cellular communication device and the communication session is a packet based session.

31. An apparatus according to claim 29, wherein the terminal is a mobile terminal and the change of the first address to the second address is a result of movement of the terminal.

32. An apparatus according to claim 29, wherein the address routed communication session is a streaming multimedia session and the terminal receives the streaming multimedia session.

33. An apparatus according to claim 29, wherein the address routed communication session is an internet protocol telephony communication session and the terminal is internet telephony capable.

34. A system comprising:

a server for conducting an address routed communication session with a communication terminal;

a circuit for sending session information with a first address, the first address used to route the session information from the server to the terminal;

a circuit for receiving, from the terminal, transitory state information of the communication session captured by the terminal when the communication session is using the first address;

a circuit for determining that the terminal requires a change of the first address to a second address during the communication session;

a circuit for changing the address used to route the session information from the first address to the second address without terminating the communication session;

a circuit for continuing the communication session with the second address, the second address used to route session information from the server to the terminal; and a circuit for using the transitory state information of the communication session received from the terminal to continue the communication session using the second address, wherein the terminal is a cellular communication device and the first address corresponds to an address assigned for a first cell and the second address corresponds to an address assigned for a second cell.

35. A system according to claim 34, further comprising a proxy server, used in the communication session with the terminal.

36. A system according to claim 34, wherein the address routed communication session is a streaming multi-media session and the server is the source of the streaming multi-media session.

37. A system according to claim 34, wherein the address routed communication session is an internet protocol telephony communication session and the terminal is internet telephony capable.

38. A system according to claim 34, wherein the terminal is a cellular communication device and the communication session is a packet based session.

39. A system according to claim 34, wherein the terminal is a mobile terminal and the change of the first address to the second address is a result of movement of the terminal.

40. A method according to claim 1, wherein the step of using, at the terminal, the transitory state information of the communication session to continue the communication session using the second address, includes providing the captured transitory state information to the session source.

41. A computer executable software code according to claim 12, wherein the code to use, at the terminal, the transitory state information of the communication session to continue the communication session using the second address, includes code to provide the captured transitory state information to the session source.

42. A computer-readable medium according to claim 13, wherein the code to use, at the terminal, the transitory state information of the communication session to continue the communication session using the second address, includes code to provide the captured transitory state information to the session source.

43. A programmed computer according to claims 14, wherein the code to use, at the terminal, the transitory state information of the communication session to continue the communication session using the second address, includes code to provide the captured transitory state information to the session source.

44. A method according to claim 15, wherein the step of using, at the terminal, the transitory state information of the communication session to continue the communication session using the second address, includes providing the captured transitory state information to the streaming source.

45. An apparatus according to claim 29, wherein the circuit, at the terminal, for using the transitory state information of the communication session to continue the communication session using the second address, includes a circuit for providing the captured transitory state information to the source.

* * * * *